United States Patent
Liu

(10) Patent No.: US 10,195,800 B2
(45) Date of Patent: Feb. 5, 2019

(54) LIGHT GUIDE PLATE, BACKLIGHT UNIT HAVING THE SAME, AND FABRICATION DEVICE AND METHOD THEREOF

(71) Applicants: BOE TECHNOLOGY GROUP CO., LTD., Beijing (CN); HEFEI BOE DISPLAY LIGHT CO., LTD., Hefei (CN)

(72) Inventor: Xiang Liu, Beijing (CN)

(73) Assignees: BOE TECHNOLOGY GROUP CO., LTD., Beijing (CN); HEFEI BOE DISPLAY LIGHT CO., LTD., Hefei (CN)

(*) Notice: Subject to any disclaimer, the term of this patent is extended or adjusted under 35 U.S.C. 154(b) by 207 days.

(21) Appl. No.: 15/302,939

(22) PCT Filed: Feb. 22, 2016

(86) PCT No.: PCT/CN2016/074268
§ 371 (c)(1),
(2) Date: Oct. 7, 2016

(87) PCT Pub. No.: WO2016/177028
PCT Pub. Date: Nov. 10, 2016

(65) Prior Publication Data
US 2017/0139107 A1   May 18, 2017

(30) Foreign Application Priority Data
May 6, 2015   (CN) .......................... 2015 1 0227446

(51) Int. Cl.
B29D 11/00   (2006.01)
B29C 47/00   (2006.01)
F21V 8/00    (2006.01)

(52) U.S. Cl.
CPC ........ *B29D 11/00663* (2013.01); *B29C 47/00* (2013.01); *G02B 6/0041* (2013.01);
(Continued)

(58) Field of Classification Search
CPC .. G02B 6/0041; G02B 6/0068; G02B 6/0065; B29D 11/00663; B29C 47/00
See application file for complete search history.

(56) References Cited

U.S. PATENT DOCUMENTS 4,684,509 A * 8/1987 Bernath ............. G01N 33/0016
                                                  324/468
5,124,095 A * 6/1992 Gianni ................. B29B 7/7414
                                                  264/349
(Continued)

FOREIGN PATENT DOCUMENTS

CN       1766709 A       5/2006
CN       101117014 A     2/2008
(Continued)

OTHER PUBLICATIONS

The First Office Action in the Chinese Patent Application No. 201510227446.2, dated Apr. 18, 2017; English translation attached.
(Continued)

*Primary Examiner* — Mathieu D Vargot
(74) *Attorney, Agent, or Firm* — Intellectual Valley Law, P.C.

(57) ABSTRACT

The present application discloses a light guide plate comprising a light incident portion having a light incident surface for receiving light from a plurality of light sources, and a plurality of closed cavities proximal to the light incident surface and within a plurality of dark regions of the light guide plate.

12 Claims, 4 Drawing Sheets

(52) U.S. Cl.
    CPC ......... *G02B 6/0065* (2013.01); *G02B 6/0068* (2013.01); *G02B 6/0061* (2013.01)

(56) References Cited

U.S. PATENT DOCUMENTS

2013/0033754 A1   2/2013   Lin et al.
2014/0160796 A1*  6/2014   He .................. G02B 6/0063
                                                    362/619

FOREIGN PATENT DOCUMENTS

| CN | 102182964 A | 9/2011 |
| CN | 102298169 A | 12/2011 |
| CN | 103676315 A | 3/2014 |
| TW | M278909 U | 10/2005 |
| WO | 2013026214 A1 | 2/2013 |

OTHER PUBLICATIONS

International Search Report & Written Opinion dated May 30, 2016 regarding PCT/CN2016/074268.
The Second Office Action in the Chinese Patent Application No. 201510227446.2, dated Dec. 27, 2017; English translation attached.

* cited by examiner

LIGHT GUIDE PLATE, BACKLIGHT UNIT HAVING THE SAME, AND FABRICATION DEVICE AND METHOD THEREOF

CROSS-REFERENCE TO RELATED APPLICATION

This application is a national stage application under 35 U.S.C. § 371 of International Application No. PCT/CN2016/074268, filed Feb. 22, 2016, which claims priority to Chinese Patent Application No. 201510227446.2, filed May 6, 2015, the contents of which are incorporated by reference in the entirety.

FIELD

The present invention relates to display technology, more particularly, to a light guide plate, a backlight unit having the same, and a fabrication device and method thereof.

BACKGROUND

Typically, a light guide plate for display devices is made of an optical-grade acrylic or polycarbonate material. A light guide plate receives light from a light source and guides the light along a transmission direction. The light guide plate enhances the brightness and ensures the light is evenly distributed in a display panel. Typically, a light guide plate includes numerous light guide points (a.k.a., light guide pattern or light guide dots), which disrupt light total reflection locally and reflect light into the display panel along a direction perpendicular to the incident light direction.

A conventional light guide plate includes a light incident surface, a light emitting surface connected with the light incident surface, a side surface opposite to the light incident surface and a bottom surface opposite to the light emitting surface. Typically, a conventional light guide plate includes numerous light guide points on the bottom surface.

SUMMARY

In one aspect, the present disclosure provides a light guide plate comprising a light incident portion having a light incident surface for receiving light from a plurality of light sources, and a plurality of closed cavities proximal to the light incident surface and within a plurality of dark regions of the light guide plate.

Optionally, the plurality of closed cavities have a substantially the same diameter in the range of about 5 mm to about 10 mm.

Optionally, the plurality of closed cavities are air bubbles.

Optionally, the plurality of closed cavities and the plurality of light sources are alternately arranged with respect to the light incident surface.

Optionally, distances between any two neighboring closed cavities are substantially the same.

Optionally, the light guide plate comprises a light emitting surface connected with the light incident surface, distances between the light emitting surface and the plurality of closed cavities are substantially the same.

Optionally, the light guide comprises a side surface opposite to the light incident surface, the plurality of closed cavities are proximal to the light incident surface and distal to the side surface.

Optionally, the light guide plate has a lower density of light guide points in the light incident portion than that of a remaining portion of the light guide plate.

In another aspect, the present disclosure provides a display device comprising a display panel comprising a display region and a peripheral region; and a light guide plate described herein, the plurality of closed cavities are substantially within a region corresponding to peripheral region.

In another aspect, the present disclosure provides a device for fabricating a light guide plate comprising a heating device for heating a light guide plate material; an extrusion device for extruding the molten light guide plate material into a molten light guide raw plate; and a plurality of pneumatic conduits for producing a plurality of closed cavities in the molten light guide raw plate.

Optionally, the plurality of pneumatic conduits are a plurality of capillary tubes.

Optionally, the device further comprises a controller for controlling the plurality of pneumatic conduits to release a fluid into the molten light guide raw plate, thereby forming the plurality of closed cavities.

Optionally, the controller is a pneumatic pump for controlling magnitude and/or duration of a pneumatic pressure to a fluid within the plurality of pneumatic conduits.

Optionally, the magnitude of the pneumatic pressure is in the range of about 1 MPa to about 100 MPa.

Optionally, the duration of the pneumatic pressure is in the range of about 0.5 second to about 2 seconds.

Optionally, the device further comprises a flattening device for flattening the molten light guide raw plate.

Optionally, the device further comprises a cooling device for cooling the molten light guide raw plate into a plastic light guide raw plate; a flattening device for flattening the plastic light guide raw plate into a plastic light guide sheet; a conveying device for leading out a plastic light guide sheet; and a cutting device for cutting the plastic light guide sheet into the light guide plate.

In another aspect, the present disclosure provides a method of fabricating a light guide plate, comprising loading a light guide material into a heating device; heating the light guide material into molten state by the heating device; extruding the molten light guide material into molten light guide raw plate by an extrusion device; and forming a plurality of closed cavities in the molten light guide raw plate by controlling injection of a fluid from a plurality of capillary tubes into the molten light guide raw plate during the extruding process.

Optionally, the method further comprises flattening the molten light guide raw plate into a plastic light guide sheet.

Optionally, the method further comprises cooling the molten light guide raw plate into a plastic light guide raw plate; and flattening the plastic light guide raw plate into a plastic light guide sheet.

Optionally, the method further comprises cutting the plastic light guide sheet into the light guide plate.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
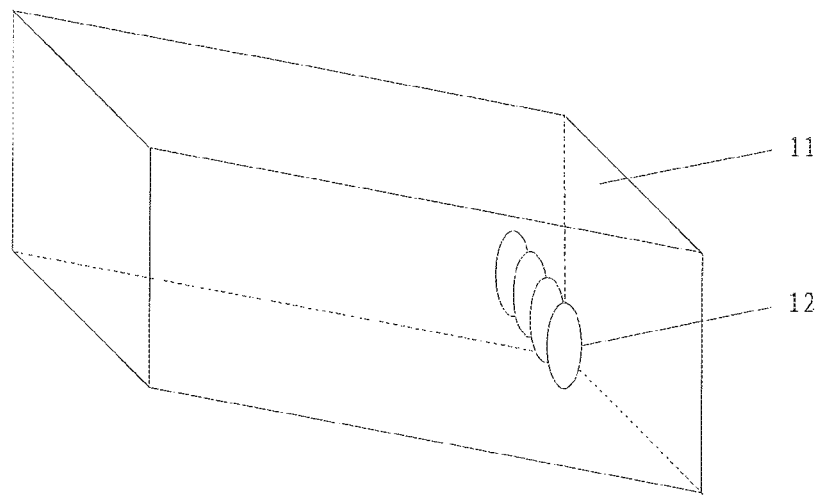
FIG. 1 is a diagram illustrating the structure of a light guide plate in some embodiments.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure identifies several issues with the conventional light guide plate. A conventional light guide plate includes a light incident portion having the light incident surface for receiving light from the light source. The light incident portion includes a number of bright regions corresponding to a number of light sources, and a number of dark regions between two neighboring bright regions. The presence of dark and bright regions results in an uneven display. When the number of light sources are reduced for energy saving consideration, the distribution density of the light sources is reduced and the distance between two neighboring light source increases, resulting in a more severe uneven image display.

The present disclosure provides a superior light guide plate, a superior backlight unit having the same, and a fabrication device and method thereof. The light guide plate, the backlight unit and a display panel having the same overcome the dark region issue associated with the conventional light guide plate, the backlight unit and the conventional display panel.

In one aspect, the present disclosure provides a backlight unit having a plurality of light sources; and a light guide plate including a light incident portion having a light incident surface for receiving light from the plurality of light sources, and a plurality of closed cavities (e.g., the cavity is enclosed by the light guide material) proximal to the light incident surface. in the present backlight unit, the light incident portion includes a plurality of first regions bright regions) each of which corresponding to a light source, and a plurality of second regions (e.g., dark regions) between two neighboring first regions. The plurality of closed cavities are within the plurality of second regions.

The closed cavity diffuses the incident light transmitted along the light incident direction, causing the light to be reflected towards the light emitting surface of the light guide plate, reducing the amount of light transmitted (e.g., by total reflection) along the light transmission direction. The present backlight unit can be an edge-lit backlight unit, in which the light transmission direction is a direction from the light incident surface to the side surface. Alternatively, the present backlight unit can be a direct-lit backlight unit, in which the light transmission direction is a direction is the tight incident direction. The closed cavity may have any appropriate geometric shapes. In some embodiments, the cavity includes biconvex surfaces, e.g., having two convex surfaces corresponding to the light incident surface and the light emitting surface, respectively. Optionally, the closed cavity is a hollow sphere or quasi-sphere such as ellipsoid. Optionally, the closed cavity is an air bubble.

In some embodiments, the closed cavity is filled with a material different from the light guide material. For example, the closed cavity can be filled with a fluid such as air. Optionally, the fluid is a liquid. Optionally, the closed cavity is filled with a solid material different from the light guide material.

Optionally, the closed cavity is located substantially in the center of a second region (e.g., a dark region). Optionally, the closed cavity is located substantially half way between the centers of two neighboring first regions (e.g., two neighboring bright regions). Optionally, a distance between the center of the closed cavity and any one of the centers of two neighboring first regions is no more than 60%, 57.5%, 55%, or 52.5% of a distance between the centers of two neighboring first regions. Optionally, a distance between the center of the closed cavity and any one of the centers of two neighboring first regions is no less than 40%, 42.5%, 45%, or 47.5% of a distance between the centers of two neighboring first regions. Optionally, all closed cavities are arranged in this manner, i.e., substantially in the center of a second region (e.g., a dark region).

In some embodiments, the plurality of closed cavities and the plurality of light sources are alternately arranged with respect to the light incident surface. Optionally, distances between any two neighboring closed cavities are substantially the same. Optionally, distances between any pair of a closed cavity and a neighboring light source are substantially the same. Optionally, distances between the light emitting surface and the plurality of closed cavities are substantially the same.

In some embodiments, the plurality of closed cavities have a substantially the same diameter. Optionally, the plurality of closed cavities have a diameter in the range of about 5 mm to about 10 mm, e.g., about 5 mm to about 7.5 mm or about 7.5 mm to about 10 mm.

The light incident portion is a portion of the light guide plate proximal to the light source. The light incident portion includes the light incident surface. In some embodiments, to ensure light is evenly distributed across the display panel, the tight guide plate has a lower density of light guide points in the light incident portion (e.g., on the bottom surface) than that of the remaining portion of the light guide plate. In some embodiments, the closed cavity is proximal to the light incident surface and distal to the side surface. Optionally, a distance between the center of the closed cavity and the light incident surface is no more than 15%, 10%, or 5% of a distance between the light incident surface and the side surface. In some embodiments, the light guide plate has a higher density of light guide points in the light incident portion (e.g., on the bottom surface) than that of the remaining portion of the light guide plate.

The present disclosure also provides a display device having a light guide plate described herein and a display panel including a display region and a peripheral region. Optionally, the plurality of closed cavities are substantially within a region corresponding to peripheral region.

Accordingly, the present disclosure also provides a novel light guide plate suitable for making the backlight unit and the display device described herein. In some embodiments, the light guide plate includes a light incident portion having a light incident surface for receiving light from the plurality of light sources, and a plurality of closed cavities proximal to the light incident surface. Optionally, the light incident portion includes a plurality of first regions (e.g., bright regions) each of which corresponding to a light source, and a plurality of second regions (e.g., dark regions) between two neighboring first regions. The plurality of closed cavities are within the plurality of second regions.

In some embodiments, the light guide plate has a lower density of light guide points in the light incident portion than that of a remaining portion of the light guide plate. In some embodiments, the closed cavity is proximal to the light incident surface and distal to the side surface. Optionally, a distance between the center of the closed cavity and the light incident surface is no more than 15%, 10%, or 5% of a distance between the light incident surface and the side surface.

In some embodiments, the plurality of closed cavities have a substantially the same diameter. Optionally, the plurality of closed cavities have a diameter in the range of about 5 mm to about 10 mm, e.g., about 5 mm to about 7.5 mm or about 7.5 mm to about 10 mm.

The closed cavity in the present light guide plate may have any appropriate geometric shapes. In some embodiments, the cavity includes biconvex surfaces, e.g., having two convex surfaces corresponding to the light incident surface and the light emitting surface, respectively. Optionally, the closed cavity is a hollow sphere or quasi-sphere such as ellipsoid. Optionally, the closed cavity is an air bubble.

In some embodiments, the closed cavity is tilled with a material different from the light guide material. For example, the closed cavity can be filled with a fluid such as air, Optionally, the fluid is a liquid. Optionally, the closed cavity is filled with a solid material different from the light guide material.

Optionally, the closed cavity is located substantially in the center of a second region. Optionally, the closed cavity is located substantially half way between the centers of two neighboring first regions. Optionally, a distance between the center of the closed cavity and any one of the centers of two neighboring first regions is no more than 60%, 57.5%, 55%, or 52.5% of a distance between the centers of two neighboring first regions. Optionally, a distance between the center of the closed cavity and any one of the centers of two neighboring first regions is no less than 40%, 42.5%, 45%, or 47.5% of a distance between the centers of two neighboring first regions. Optionally, all closed cavities are arranged in this manner, i.e., substantially in the center of a second region.

Optionally, distances between any two neighboring closed cavities are substantially the same. Optionally, the distance between any two neighboring closed cavities is about 4 mm. Optionally, distances between any pair of a closed cavity and a neighboring first region are substantially the same. Optionally, distances between the light emitting surface and the plurality of closed cavities are substantially the same.

In another aspect, the present disclosure provides a device for fabricating a light guide plate. In some embodiments, the device includes a beating device (e.g., a heating chamber) for heating a light guide plate material into a molten light guide plate material; an extrusion device for extruding the molten light guide plate material into a molten light guide raw plate; and a plurality of pneumatic conduits for producing a plurality of closed cavities in the molten light guide raw plate. Optionally, the pneumatic conduit is a capillary tube, e.g., a metal capillary tube.

In some embodiments, the device further includes a controller for controlling the plurality of pneumatic conduits to release a fluid (e.g., an air bubble or a liquid) into the molten light guide raw plate, thereby forming the plurality of closed cavities. In some devices, the controller is a pneumatic pump for controlling magnitude and/or duration of the pneumatic pressure to a fluid within the plurality of pneumatic conduits. For example, the controller may automatically control the plurality of pneumatic conduits to release a fluid in a repeating pattern in accordance with the distribution pattern of the plurality of closed cavities. Optionally, the pneumatic pressure is in the range of about 1 MPa to about 100 MPa, e.g., about 1 MPa to about 20 MPa, about 20 MPa to about 40 MPa, about 40 MPa to about 600 MPa, about 60 MPa to about 80 MPa, or about 80 MPa to about 100 MPa. Optionally, the pneumatic pressure is in the range of about 0.5 second to about 2 seconds. E.g., about 0.5 second to about 1 second or about 1 second to about 2 seconds.

In some embodiments, the device further includes a flattening device for flattening the molten light guide raw plate. For example, the flattening device may include a pre-flattening roller and a main roller. The pre-flattening roller pre-flattens irregularities on the surface of the molten light guide raw plate, and the main roller flattens the entire pre-flattened molten light guide raw plate.

Optionally, the device further includes a cooler device for cooling the molten light guide raw plate into a plastic light guide raw plate. The flattening device then flattens the plastic light guide raw plate into a plastic light guide sheet. Optionally, the device further includes a conveying device for leading out a plastic light guide sheet. Optionally, the device further includes a cutting device for cutting the plastic light guide sheet into the light guide plate.

The present disclosure further provides a method of fabricating a light guide plate. In some embodiments, the method includes one or more of the following steps: loading a light guide material into a heating chamber; heating the light guide material into molten state by the heating chamber; extruding the molten light guide material into molten light guide raw plate by an extrusion device; and forming a plurality of closed cavities in the molten light guide raw plate by controlling injection of a fluid from a plurality of capillary tubes into the molten light guide raw plate during the extruding process. Optionally, the extrusion device is an outlet of the heating device.

Optionally, the method further includes flattening the molten light guide raw plate into a plastic light guide sheet. Optionally, the method further includes cooling the molten light guide raw plate into a plastic light guide raw plate; and flattening the plastic light guide raw plate into a plastic light guide sheet. Optionally, the method further includes cutting the plastic light guide sheet into the light guide plate.

In some embodiments, the step of forming a plurality of closed cavities in the molten light guide raw plate includes inserting the plurality of pneumatic conduits (e.g., a plurality of capillary tubes) into the molten light guide raw plate, injecting a certain amount of fluid from a plurality of pneumatic conduits into the molten light guide raw plate during the extruding process, and separating the plurality of pneumatic conduits from the molten light guide raw plate afterwards. The fluid injection is controlled by a controller. Optionally, the controller is a pneumatic pump for controlling magnitude and/or duration of the pneumatic pressure to a fluid within the plurality of capillary tubes. Optionally, the step of injecting a fluid from a plurality of capillary tubes into the molten light guide raw plate includes turning on the pneumatic pump and turning on a valve connected to the plurality of pneumatic conduits. Once the fluid is injected, the valve and the pneumatic pump are to be turned off and the plurality of pneumatic conduits are withdrawn from the molten light guide raw plate (e.g., withdrawn along the insertion angle).

Optionally, the plurality of pneumatic conduits are inserted into the molten light guide raw plate when the molten light guide raw plate is highly elastic, e.g., right after the molten light guide raw plate is extruded from an extrusion device. Optionally, the plurality of capillary tubes are inserted into the molten light guide raw plate at a certain insertion angle with respect to the surface of the molten light guide raw plate and with a certain insertion depth. Optionally, the insertion angle is in the range of about 30 degrees to about 60 degrees.

FIG. 1 is a diagram illustrating the structure of a light guide plate in some embodiments. Referring to FIG. 1, the light guide plate 11 includes a plurality of closed cavities 12. In the light guide plate 11, each closed cavity is located within a dark region formed between two light sources in the light incident portion. That is, in a backlight unit having the light guide plate in the embodiment, the light guide plate includes a closed cavity (e.g., a bubble) in the light incident portion between two light sources (e.g., two LED units in a LED light strip). For example, the point light sources (the LED units) in a LED light strip are evenly distributed in the light strip, the plurality of closed cavities are also evenly distributed in the light incident portion. Thus, the distances between any two closed cavities can be set to be substantially the same. Having the closed cavities substantially in the center of a dark region substantially half way between two light sources) is advantageous, in a conventional light guide plate, light emitted from the dark regions is much weaker than that from the bright regions. The presence of dark regions in the light guide plate results in an uneven light distribution in the display panel. The present light guide plate includes a plurality of closed cavities in these regions, increasing the brightness around the dark regions and making the light distribution across the entire display panel more evenly.

Figure 7:
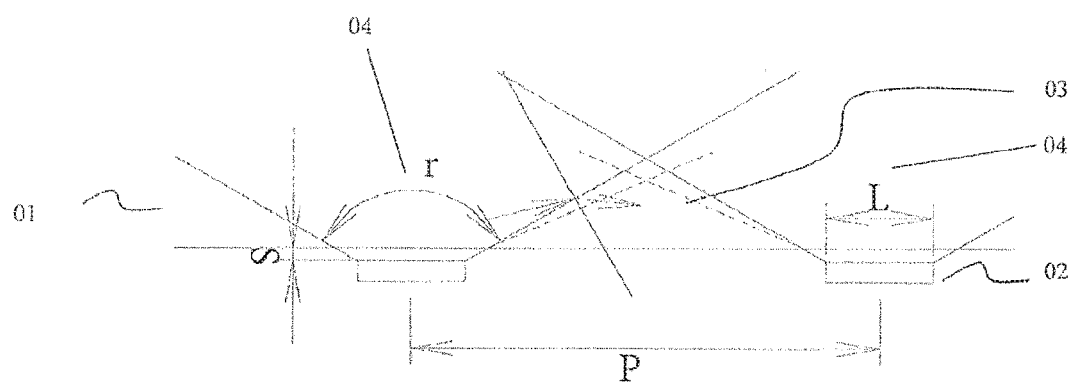
FIG. 7 is a diagram illustrating light path in a conventional light guide plate.

FIG. 7 a diagram illustrating an exemplary light path in a conventional light guide plate. As shown in FIG. 7, the light guide plate 01 in the embodiment includes a triangular dark region 03 between two neighboring separate light sources 02, and two bright regions 04 spaced apart by the dark region 03. As used herein, the term "dark region" refers to a substantially triangular region between two neighboring separate light sources (e.g., dot light sources), having the light incident surface of the light guide plate as the base of the triangle, and an area as defined according to the following equation:

$$\frac{1}{4}(P-L)^2 \tan(90°-r/2)-S(P-L)+S^2 \tan r/2$$

wherein L is the length of the light source, P is the pitch between the two neighboring light sources, S is a distance between the light emission surface of the dot light source and the light incident surface of the LGP, and r is the emission angle of the light sources. Optionally, the base of the triangle dark region has a midpoint substantially overlaps with the midpoint between two neighboring separate light sources. Optionally, each closed cavity is positioned substantially aligned with the midpoint of the base (e.g., within 5%, 10%, 20%, or 30% of the length of the dark region base). The bright region is a region of a light incident portion of the light guide plate that is outside of the dark region (e.g., spaced apart by the dark regions), having a base between two bases of neighboring dark regions. Optionally, the bright region has a midpoint substantially aligned with a light source (e.g., within 5%, 10%, 20%, or 30% of the length of the bright region base).

Figure 2:
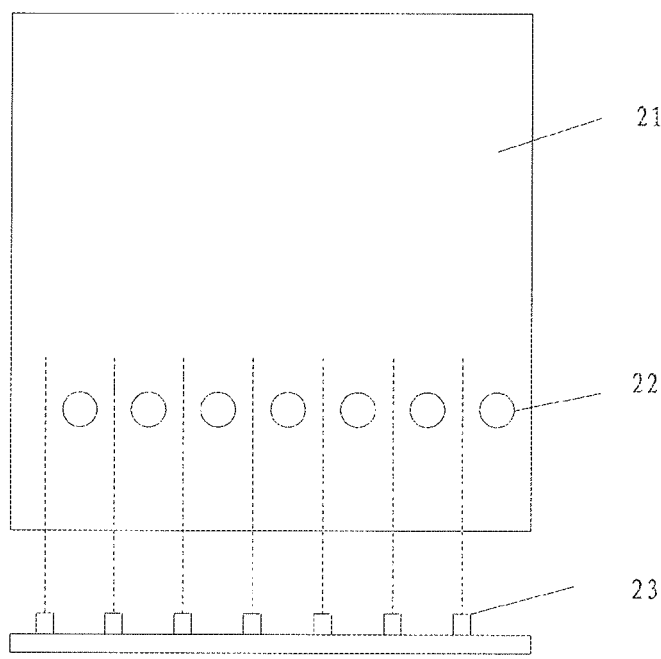
FIG. 2 is a diagram illustrating the structure of a backlight unit having a light guide plate and a plurality of light sources in some embodiments.

FIG. 2 is a diagram illustrating the structure of a backlight unit having a light guide plate and a plurality of light sources in some embodiments. Referring to FIG. 2, the backlight unit includes a light guide plate 21 having a plurality of closed cavities 22 and a light strip having a plurality of light sources 23. As shown in FIG. 2, each of the plurality of closed cavities in the embodiment is within a dark region between two neighboring bright regions, Each of the bright region corresponds to a light source 23. In the backlight unit in FIG. 2, the plurality of LED light source 23 are evenly distributed on the light strip, and the plurality of closed cavities 22 are evenly distributed in the light guide plate 21.

The light guide plate includes a central region and a peripheral region. The central region of the light guide plate corresponds to the display region of a display panel, and the peripheral region of the light guide plate corresponds to the peripheral region (e.g., non-display region) of a display panel. To avoid any adverse effects on display quality, the plurality of closed cavities are substantially within the peripheral region of the light guide plate corresponding to the peripheral region of a display panel.

In some embodiments, the plurality of closed cavities are positioned on a same horizontal plane with respect to a surface of the light guide plate. For example, in an edge-lit backlight unit, the light guide plate includes a light incident surface, a light emitting surface connected with the light incident surface, a bottom surface opposite to the light emitting surface, and a side surface opposite to the light incident surface. In the edge-lit backlight unit, the plurality of closed cavities are positioned on a same horizontal plane with respect to the light emitting surface, e.g., the distances between the light emitting surface and the plurality of closed cavities are substantially the same, and the distances between the bottom surface and the plurality of closed cavities are substantially the same. One of the functions of the plurality of closed cavities is to reduce the amount of light transmitted (e.g., by total reflection) along the light transmission direction. Accordingly, in some embodiments, the plurality of closed cavities are proximal to the light incident surface and distal to the side surface. The closed cavity diffuses the incident light, causing the light to be reflected towards the light emitting surface of the light guide plate.

In some embodiments, the plurality of closed cavities (e.g., bubbles) have substantially the same size. The smaller the size, the more even the light distribution can be in the display panel. Optionally, the plurality of closed cavities have a diameter in the range of about 5 mm to about 10 mm.

In some embodiments, the backlight unit includes a light source, an optical film, a reflective panel, and a light guide plate as described herein. Optionally, the backlight unit is an edge-lit backlight unit. Optionally, the light guide plate is between the reflective panel and the optical film. The reflective panel is on the bottom surface of the light guide plate, and the optical film is on the light emitting surface of the light guide plate.

The light guide plate and the backlight unit according to the present disclosure includes a plurality of closed cavities in the light incident portion of the light guide plate. The plurality of closed cavities reflect the incident light in the dark regions, reducing the amount of light transmitted (e.g., by total reflection) along the light transmission direction. The light reflected by the plurality of closed cavities emits out from the light emitting surface of the light guide plate, increasing the brightness around the dark regions and making the light distribution across the entire display panel more evenly.

Figure 3:
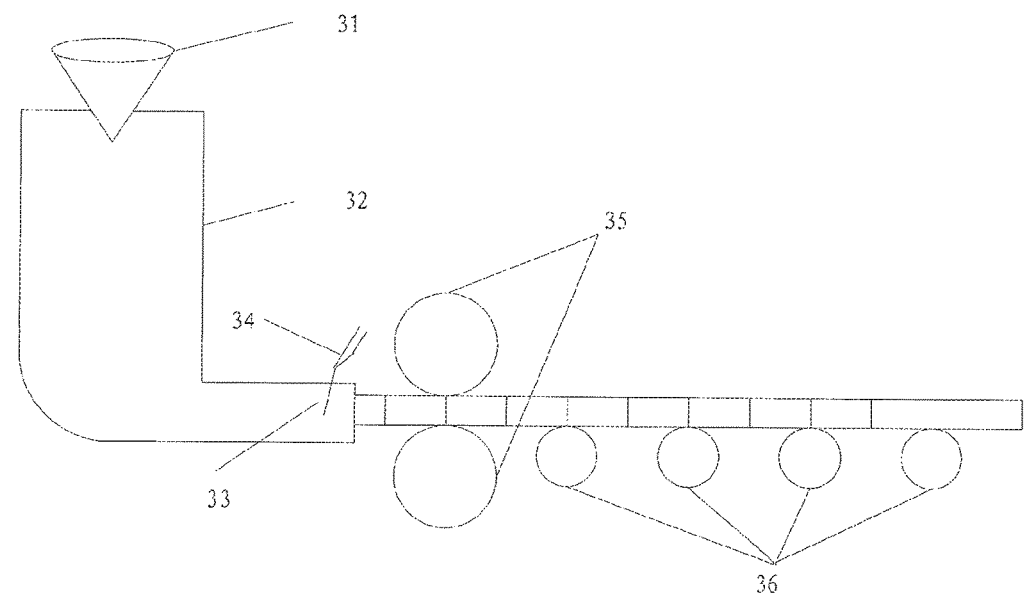
FIG. 3 is a diagram illustrating the structure of a device for fabricating a light guide plate in some embodiments.

FIG. 3 is a diagram illustrating the structure of a device for fabricating a light guide plate in some embodiments.

Referring to FIG. 3, the device in the embodiment includes a light guide material inlet 31, a heating chamber 32, a pneumatic conduit 33, a controller 34, a flattening device 35 and a conveyer 36.

The light guide material inlet 31 is used for loading the light guide material (e.g., an acrylic material) into the heating chamber 32. The heating chamber 32 is connected to the light guide material inlet 31, and heats the light guide material into a molten state. The molten light guide material is extruded from the heating chamber (e.g., by an extrusion device) into a molten light guide raw plate. The plurality of pneumatic conduit 33 are used for forming a plurality of closed cavities in the molten light guide raw plate by controlling injection of a fluid (e.g., air) from a plurality of pneumatic conduits 33 into the molten light guide raw plate during the extruding process. For example, the plurality of pneumatic, conduit 33 can be inserted into the molten light guide raw plate to form a plurality of air bubbles. The controller 34 is outside the heating chamber, and is connected to an end of each of the plurality of pneumatic conduits 33.

Optionally, the pneumatic conduit 33 is a capillary tube, e.g., a metal capillary tube, located proximal to the extrusion device (e.g., an outlet of the heating chamber 32). One end of the metal capillary tube is inserted into the molten light guide raw plate at a certain insertion angle with respect to the surface of the molten light guide raw plate and with a certain insertion depth. The other end of the metal capillary tube may optionally include a valve for turning on and off the metal capillary tube. Optionally, the metal capillary tube has an inner diameter in the range of about 10 μm to about 1000 μm. Having the metal capillary tube proximal to the outlet of the heating chamber 32 is advantageous because the molten light guide raw plate being extruded from the outlet is highly elastic, a condition suitable for forming closed cavities (e.g., bubbles).

The controller 34 may be a controllable pneumatic pump connected with an end of the metal capillary tube for controlling magnitude and/or duration of a pneumatic pressure within the metal capillary tube. When the pneumatic pump and the valve on the metal capillary tube are turned on, the pneumatic pump can be controlled to have air injected from a plurality of capillary tubes into the molten light guide raw plate. The molten light guide raw plate extruded from the outlet of the heating chamber 32 is highly elastic, suitable for forming bubbles therewithin. Optionally, the plurality of metal capillary tubes are inserted into the molten light guide raw plate at a certain insertion angle with respect to the surface of the molten light guide raw plate and with a certain insertion depth. Optionally, the insertion angle is in the range of about 30 degrees to about 60 degrees. The insertion depth may be determined in part based on the thickness of the molten light guide raw plate.

Figure 4:
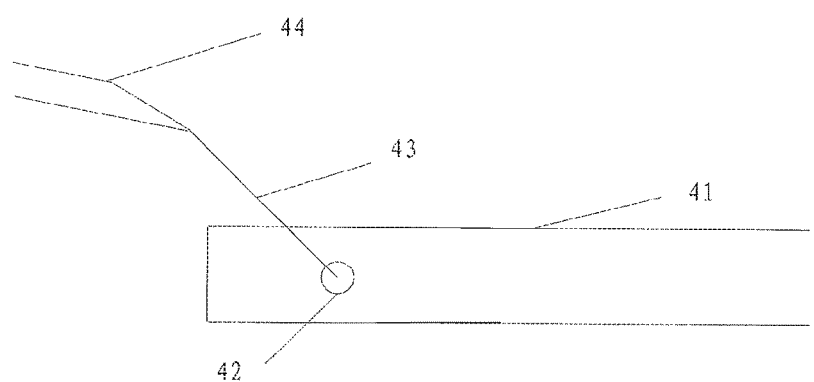
FIG. 4 is a diagram illustrating the structure of a device for fabricating a light guide plate in some embodiments.

FIG. 4 is a diagram illustrating the structure of a device for fabricating a light guide plate in some embodiments. Referring to FIG. 4, when the molten light guide raw plate 41 is extruded from the outlet of the heating chamber, the controllable pneumatic pump 44 controls the magnitude and/or duration of a pneumatic pressure within the metal capillary tube 43, forming a bubble 42 in the molten light guide raw plate 41.

Optionally, the magnitude of the pneumatic pressure is in the range of about 1 MPa to about 100 MPa. Optionally, the duration of the pneumatic pressure is in the range of about 0.5 second to about 2 seconds. Based on the magnitude of the pneumatic pressure in the above-mentioned ranges, a bubble having a diameter in the range of about 5 mm to about 10 mm can be formed. Depending on the desired bubble size, the magnitude of the pneumatic pressure can be adjusted by the controllable pneumatic pump 44. Once the bubble is injected, the valve and the pneumatic pump are to be turned off and the plurality of metal capillary tubes are rapidly separated from the molten light guide raw plate 41, e.g., along the insertion angle).

Figure 5:
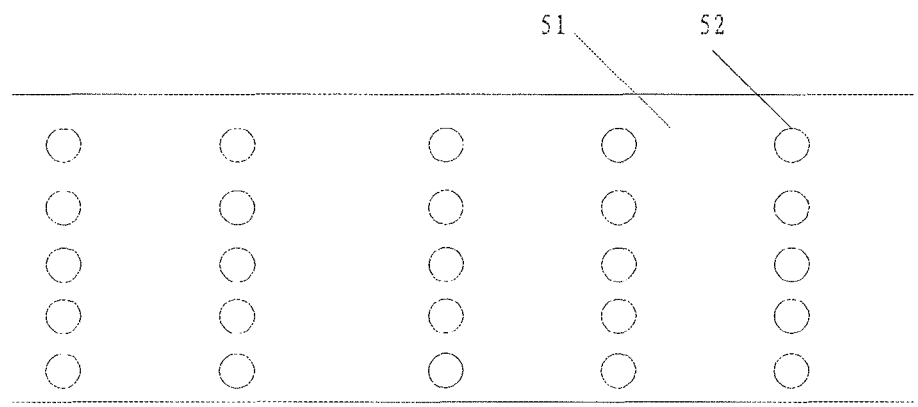
FIG. 5 is a diagram illustrating the structure of an acrylic light guide sheet having a plurality of closed cavities in some embodiments.

Referring to FIG. 3, in some embodiments, the flattening device 35 includes a pre-flattening roller and a main roller. The pre-flattening roller pre-flattens irregularities on the surface of the molten light guide raw plate, and the main roller flattens the entire pre-flattened molten light guide raw plate. The flattening device 35 flattens the molten light guide raw plate into a plastic light guide sheet (e.g., an acrylic light guide sheet). The molten light guide raw plate at this stage has not completely cooled down, and is suitable for the flattening process. Optionally, the device further includes a cooling device for cooling the molten light guide raw plate into a plastic light guide raw plate. Optionally, the flattening device flattens the plastic light guide raw plate into a plastic light guide sheet. Further, the device may include a conveying device for leading out a plastic light guide sheet. FIG. 5 is a diagram illustrating the structure of an acrylic light guide sheet 51 having a plurality of bubbles 52 in some embodiments.

Subsequently, the plastic light guide sheet is further process to be cut into a plurality of light guide plates having an appropriate size. Further, the light guide plate can be treated (e.g., by laser) to include a plurality of light guide points on a surface (e.g., the bottom surface) of the light guide plate. The density of the light guide points can be designed for various applications. The light guide plate manufactured by the device according to the present disclosure includes a plurality of closed cavities in the light incident portion of the light guide plate. The plurality of closed cavities reflect the incident light in the dark regions, reducing the amount of light transmitted (e.g., by total reflection) along the light transmission direction. The light reflected by the plurality of closed cavities emits out from the light emitting surface of the light guide plate, increasing the brightness around the dark regions and making the light distribution across the entire display panel more evenly.

Figure 6:
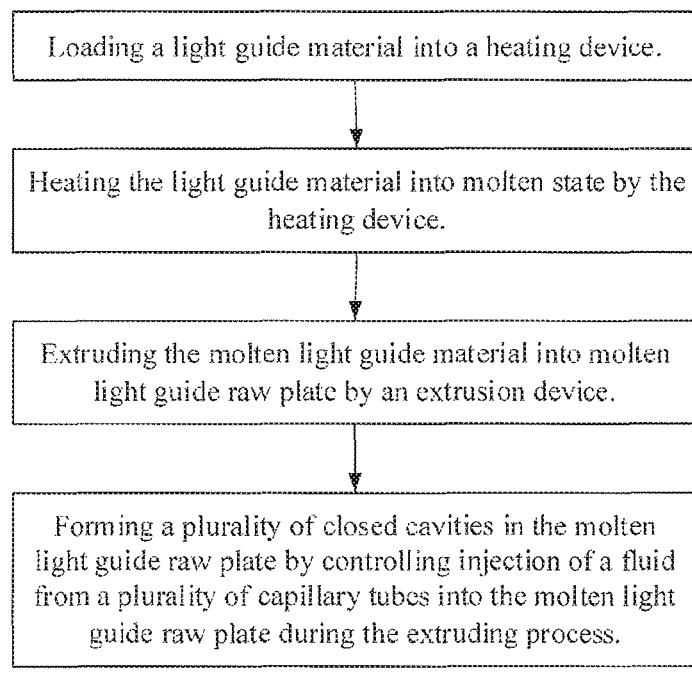
FIG. 6 is a flow chart illustrating a method of fabricating a light guide plate in some embodiments.

FIG. 6 a flow chart illustrating a method of fabricating a light guide plate in some embodiments. Optionally, the fabrication utilizes a device as shown in FIG. 3. Referring to FIG. 6, the method in the embodiment includes loading a light guide material into a heating device; heating the light guide material into molten state by the heating device; extruding the molten light guide material into molten light guide raw plate by an extrusion device; and forming a plurality of closed cavities in the molten light guide raw plate by controlling injection of a fluid from a plurality of capillary tubes into the molten light guide raw plate during the extruding process. Optionally, the extrusion device is an outlet of the heating device.

Optionally, the light guide material is continuously loaded into the heating device during a certain period, and the molten light guide material is continuously extruded from the heating device by an extrusion device (e.g., an outlet of the heating device) during the same period. The continuous period may be a period for a production cycle.

Optionally, the method further includes flattening the molten light guide raw plate into a plastic light guide sheet. Optionally, the method further includes cooling the molten light guide raw plate into a plastic light guide raw plate; and flattening the plastic light guide raw plate into a plastic light guide sheet. Optionally, the method further includes cutting the plastic light guide sheet into the light guide plate.

In some embodiments, the step of forming a plurality of closed cavities in the molten light guide raw plate includes inserting the plurality of pneumatic conduits (e.g., a plurality of metal capillary tubes) into the molten light guide raw plate, injecting a certain amount of fluid (e.g., air) from a plurality of pneumatic conduits into the molten light guide raw plate during the extruding process, and separating the plurality of pneumatic conduits from the molten light guide raw plate afterwards. The fluid injection is controlled by a controller. Optionally, the controller is a pneumatic pump for controlling magnitude and/or duration of the pneumatic pressure to a fluid within the plurality of capillary tubes. Optionally, the step of injecting a fluid from a plurality of capillary tubes into the molten light guide raw plate includes turning on the pneumatic pump and turning on a valve connected to the plurality of pneumatic conduits. Once the fluid is injected, the valve and the pneumatic pump are to be turned off and the plurality of pneumatic conduits are withdrawn from the molten light guide raw plate (e.g., withdrawn along the insertion angle).

Optionally, the plurality of pneumatic conduits (e.g., a plurality of metal capillary tubes) are inserted into the molten light guide raw plate when the molten light guide raw plate is highly elastic, e.g., right after the molten light guide raw plate is extruded from an extrusion device (e.g., at the outlet of the heating device). Optionally, the plurality of metal capillary tubes are inserted into the molten light guide raw plate at a certain insertion angle with respect to the surface of the molten light guide raw plate and with a certain insertion depth. Optionally, the insertion angle is in the range of about 30 degrees to about 60 degrees.

Optionally, the molten light guide raw plate is continuously extruded from the extrusion device (e.g., an outlet of the heating device). Optionally, the insertion and withdrawal of the plurality of metal capillary tubes into the molten light guide raw plate is performed repeatedly with an interval period. The interval period can be determined based on the speed of the extrusion and conveyance of the light guide plate, the length of the desired light guide plate, the desired number of bubbles in the light guide plate, etc.

The light guide plate manufactured by the method according to the present disclosure includes a plurality of closed cavities in the light incident portion of the light guide plate. The plurality of closed cavities reflect the incident light in the dark regions, reducing the amount of light transmitted (e.g., by total reflection) along the light transmission direction. The light reflected by the plurality of closed cavities emits out from the light emitting surface of the light guide plate, increasing the brightness around the dark regions and making the light distribution across the entire display panel more evenly.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A device for fabricating a light guide plate, comprising:
a heating device for heating a light guide plate material;
an extrusion device for extruding the molten light guide plate material into a molten light guide raw plate;
a plurality of pneumatic conduits for producing a plurality of closed cavities in the molten light guide raw plate; and
a controller for controlling the plurality of pneumatic conduits to release a fluid into the molten light guide raw plate, thereby forming the plurality of closed cavities;
wherein ends of the plurality of pneumatic conduits for releasing the fluid are arranged substantially on a same horizontal plane relative to the molten light guide raw plate;
the ends of the plurality of pneumatic conduits for releasing the fluid of any two adjacent pneumatic conduits of the plurality of pneumatic conduits are spaced apart from each other by a substantially same distance; and
the controller comprises a pneumatic pump for applying a pneumatic pressure of a substantially same magnitude and a substantially same duration to the fluid in each of the plurality of pneumatic conduits.

2. The device of claim 1, wherein the plurality of pneumatic conduits are a plurality of capillary tubes.

3. The device of claim 1, further comprising a flattening device for flattening the molten light guide raw plate.

4. The device of claim 1, further comprising
a cooling device for cooling the molten light guide raw plate into a plastic light guide raw plate;
a flattening device for flattening the plastic light guide raw plate into a plastic light guide sheet;
a conveying device for leading out a plastic light guide sheet; and
a cutting device for cutting the plastic light guide sheet into the light guide plate.

5. A method of fabricating a light guide plate, comprising:
loading a light guide material into a heating device;
heating the light guide material into molten state by the heating device;
extruding the molten light guide material into molten light guide raw plate by an extrusion device; and forming a plurality of closed cavities in the molten light guide raw plate by controlling injection of a fluid from a plurality of capillary tubes into the molten light guide raw plate during the extruding process;

wherein controlling injection of the fluid from the plurality of capillary tubes into the molten light guide raw plate during the extruding process comprises:

controlling the plurality of capillary tubes to form the plurality of closed cavities on a same horizontal plane relative to a surface of the light guide plate, any two adjacent closed cavities of the plurality of closed cavities being formed spaced apart from each other by a substantially same distance; and applying a pneumatic pressure of a substantially same magnitude and a substantially same duration to the fluid in each of the plurality of pneumatic conduits.

6. The method of claim 5, wherein controlling injection of the fluid from the plurality of capillary tubes into the molten light guide raw plate during the extruding process is performed under pneumatic pressure having a magnitude in a range of about 1 MPa to about 100 MPa.

7. The method of claim 5, wherein controlling injection of the fluid from the plurality of capillary tubes into the molten light guide raw plate during the extruding process is performed under a pneumatic pressure for a duration in a range of about 0.5 second to about 2 seconds.

8. The method of claim 5, further comprising flattening the molten light guide raw plate into a plastic light guide sheet.

9. The method of claim 5, further comprising:
cooling the molten light guide raw plate into a plastic light guide raw plate; and
flattening the plastic light guide raw plate into a plastic light guide sheet.

10. The method of claim 8 or claim 9, further comprising cutting the plastic light guide sheet into the light guide plate.

11. The method of claim 5, wherein forming the plurality of closed cavities comprises forming a plurality of closed cavities of a substantially same size.

12. The method of claim 11, wherein the plurality of closed cavities of the substantially same size have a diameter in a range of approximately 5 mm to approximately 10 mm.

* * * * *